W. T. Barnes,
Auger Handle,
No 6,256.    Patented Apr. 3, 1849.

UNITED STATES PATENT OFFICE.

W. T. BARNES, OF BUFFALO, NEW YORK.

AUGER-STOCK.

Specification of Letters Patent No. 6,256, dated April 3, 1849.

*To all whom it may concern:*

Be it known that I, WILLIAM T. BARNES, of Buffalo, in the county of Erie and State of New York, have invented a new and useful Auger-Stock, of which the following is a full and exact description, reference being had to the annexed drawings of the same, making part of this specification, in which—

Figure 3:
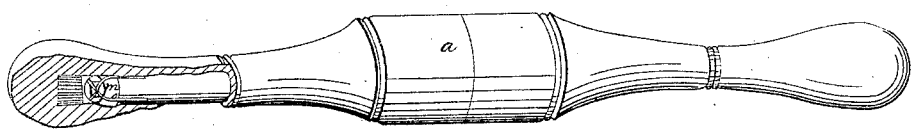
Figure 2:
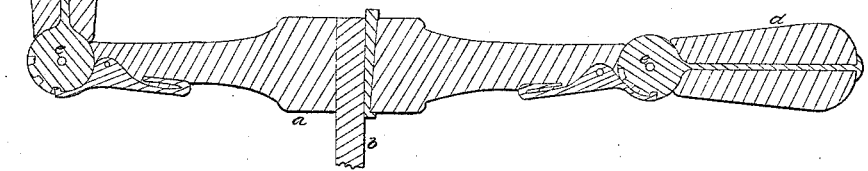
Figure 1:
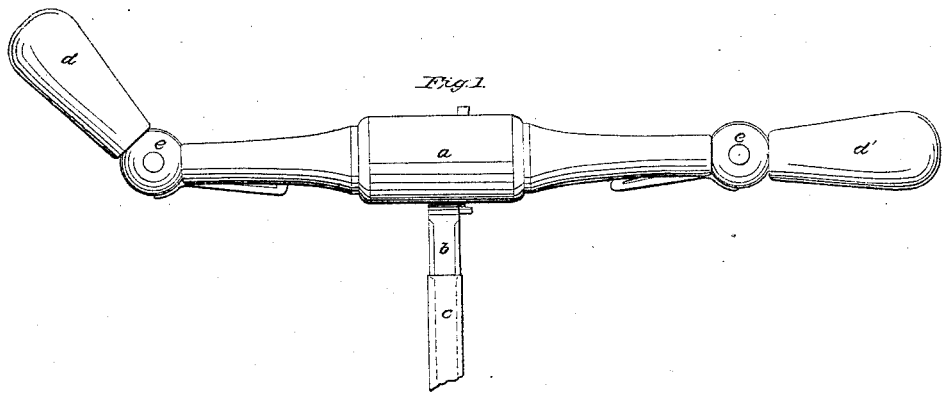

Figure 1 is an elevation exhibiting the stock, handles, and so much of the shank as is required to show the manner in which the turning collar is applied thereto. Fig. 2 is a vertical longitudinal section taken through Fig. 1. Fig. 3 is a sectional perspective view exhibiting one mode in which the spindles and the handles which turn upon them are arranged.

The same letters indicate the same parts in all the figures.

From the peculiar manner in which it is necessary to apply manual force to bore with a common carpenter's auger, the hands of the operator are in general very soon blistered, and in all cases rendered sore. To avoid this difficulty and also at the same time to facilitate the use of the instrument, and lessen the labor of performing a given amount of boring with it, is the object of my present invention.

In the accompanying drawings $a$ is the stock having a mortise through its middle in which the shank of the auger is secured in any suitable manner.

$b$ is the shank of the auger having a collar $c$ secured upon it near the stock, in any way that will leave it free to turn. This collar is sufficiently long to extend on both sides of the hand by which it is grasped to steady the auger. $d\ d'$ are the handles made of a convenient size and turning freely on the hinged spindles $e\ e$. These spindles have flat circular joints as represented, the periphery of the central piece having notches on its edge into which a spring detent takes to hold the handle at any angle to the central part of the stock that may be required, for instance when the screw of the auger is being entered into the piece of wood to be bored, it is first placed in the proper position, the collar is then grasped by the left hand to hold it there, and one handle being turned at right angles to the stock forms a winch or crank with which the screw is quickly run down, although by the auger in common use, to run the screw down takes as much time as an equal depth of boring, besides being very liable to break off the screw by the accidental bending over of the top of the shank. This accident in using my improved stock will be much less frequent than by the old method.

In case it becomes necessary to bore a hole in a place too narrow to turn an auger stock of the usual length, all that is necessary to be done to overcome the difficulty, is to turn both handles of the stock parallel to the shank, which will in stocks of the usual proportions shorten it one half. There are a great variety of cases where the property of contractility in the length of the handles will be found advantageous.

The handles represented in Fig. 3 turn on spindles formed on the ends of the central part of the stock, the outer ends $m$ of these spindles are enlarged and fit into a corresponding enlargement in the cavity of the handles. For the purpose of introducing the enlarged portion or head of the spindle through the smaller part of the cavity in the handle, into the expanded part I make two or more saw kerfs $o$, parallel to the axis of the spindle, and crossing each other, which when the head is pushed into the cavity of the handle allow the sections to approach each other so that it will be contracted to the diameter of the shank, until it arrives at the wide part of the cavity, when it expands by its own elasticity to the position represented in the handle, a part of which is removed to exhibit its internal structure, the shoulder of the head holding it fast upon the spindle, without interfering with its turning upon the same.

What I claim as my invention and desire to secure by Letters Patent is—

1. The combination of the revolving adjustable handles with the stock, the same being arranged and operated substantially in the manner and for the purpose herein described.

2. The combination of the turning collar on the shank of the auger, with the stock, substantially as herein described, the collar to be grasped in the hand to guide the auger when beginning to bore a hole while being turned by the handle, adjusted so as to operate in the manner of a winch, whereby the auger is more steadily held and more readily entered into the wood as herein set forth.

WILLIAM T. BARNES.

Witnesses:
P. H. WATSON,
WM. D. WASHINGTON.